United States Patent [19]

Castro et al.

[11] 4,369,339
[45] Jan. 18, 1983

[54] METHOD FOR COMPLETING THE CONNECTION BETWEEN A TELEPHONE EXCHANGE AND THE PHONE SUBSCRIBER'S LINE IN RESPONSE TO THE RECEPTION, AT THE EXCHANGE, OF A PRE-ESTABLISHED CODE

[76] Inventors: Marcelo Castro; Horacio Castro, both of El Salvador 5962, Buenos Aires, Argentina

[21] Appl. No.: 194,365

[22] Filed: Oct. 6, 1980

[51] Int. Cl.³ .............................................. H04M 3/38
[52] U.S. Cl. ................................ 179/84 C; 179/18 D
[58] Field of Search ............. 179/18 D, 18 DA, 84 C, 179/89, 27 CB, 27 DB, 2 R, 2 A

[56] References Cited
U.S. PATENT DOCUMENTS 3,654,396 4/1972 Biezeveld .......................... 179/18 D Primary Examiner—Joseph A. Popek
Attorney, Agent, or Firm—Fleit & Jacobson

[57] ABSTRACT

A method and apparatus for processing coded information received through a telephone network corresponding to the phone subscriber to complete the connection between the final selector of the network and the subscriber's line only when, at the network, a pre-established code is received. The method comprises detecting the presence of ringing a signal at the phone subscriber's line at the final selector stage of the exchange, opening the phone subscriber's line in response to the detection of the ringing signal, sending from the calling end a code signal, filtering-out the ringing signal and letting through the code characters, decoding the code signal, comparing the code signal with one or more memorized codes, generating a validation signal when a match occurs and closing again the phone subscriber's line only in response to the simultaneous presence of the detected ringing signal and the validation signal. Thus the called subscriber will receive no ringing signal if a right code is not received. Further, the system can be deactivated by transmitting a special code from the subscriber's phone.

10 Claims, 3 Drawing Figures

METHOD FOR COMPLETING THE CONNECTION BETWEEN A TELEPHONE EXCHANGE AND THE PHONE SUBSCRIBER'S LINE IN RESPONSE TO THE RECEPTION, AT THE EXCHANGE, OF A PRE-ESTABLISHED CODE

BACKGROUND OF THE INVENTION

1. Field of the Invention

The present invention relates in general to the telephone transmission of data allowing the phone subscriber to receive only calls from persons who are in possession of a pre-established code. The operations allowing this are performed at the exchange to which the phone set of the subscriber pertains. If no code is received at the exchange, this latter will not send the ringing signal to the subscriber's phone set.

2. Description of the Prior Art

A phone subscriber is commonly pestered by innumerable unwanted phone calls, even in the small hours or when he is busy and he does not desire to be perturbed. A method to obviate such inconveniences is to have a private exchange attended by an operator who acts like a screen between the calling and the called parties. However, it may happen that the operator is not sure of the importance of the call; in such case the operator must assume the responsibility of transferring the communication, in which case said operator must interrupt the called party or, in the opposite case, look for an excuse for obviating said interruption. In this latter case it may happen that the operator is wrong in evaluating the importance of the true urgency of the message motivating the call. A device, supposedly intended for obviating inconveniences of this sort, is the automatic answering recorder. However, this kind of apparatus does not allow the called party to know if the calling party is a desired one, before the latter hangs up. Such an apparatus is useful for knowing which persons have called during a period of absence of the phone subscriber. Later on he may replay all the recorded messages which have been left by the calling parties during his absence. It is not practical to put in operation such an apparatus when the phone subscriber is present because he may lose the chance to receive important or simple desired calls at the moment when they are being made. It is also possible to resort to a company rendering answering services. While such services offer obviously several advantages, they also have various inherent drawbacks. One of them is that the answering service retains the phone line of the phone subscriber during all the time the service is rendered. Another drawback is that the operators of such services become acquainted with the nature of the received message and thus there is no privacy or secrecy. Still another drawback lies in the fact that there is a considerable delay between the reception of the message by the answering service and the moment when the called subscriber becomes acquainted therewith. Another device used by some phone subscribers to get privacy, and which is available on the market, is a simple switch connected in series with the circuit of the ringing bell of the phone set. When the switch is open, the bell will not sound and thus the phone subscriber will never become aware of the fact that a phone call is being made to him. This is obviously a very inconvenient method, since the phone subscriber may miss one or more very important and/or urgent calls. The phone subscriber has no means to know if a call is being made and if the calling party is or is not a desired one. Another very important drawback is that if the phone subscriber forgets to close the switch when he desires to be again in condition of receiving calls, he may remain uncommunicated during several hours, or even days, without becoming aware of the fact.

Also a method and apparatus have been suggested which allow the phone subscriber to receive calls only from persons which are in possession of a pre-established code. However, it is necessary to provide such an apparatus at the same location at which the phone subscriber's set is located. However, according to this invention, similar functions may be performed by an apparatus located at the exchange to which the phone subscriber pertains. Notwithstanding, the means for carrying out such functions are in this case somewhat different, and some are differently arranged, with respect to the means suggested by the prior art method and apparatus.

SUMMARY OF THE INVENTION

The present invention provides a method and apparatus allowing a phone subscriber to receive only calls which are followed by a preestablished code comprising at least one character. According to this method, when the exchange receives a call addressed to a certain phone subscriber, at the output of the corresponding final selector stage of the exchange appears a ringing signal that would normally be sent to the phone subscriber's set. However, this ringing signal is detected and in response thereto, the line between the corresponding output of the final selector stage and the phone subscriber's set is opened. Thus substantially no ringing signal will be received at the phone set of the subscriber and the bell of the phone set will not sound. However, if the calling party sends now a pre-established code, comprising at least one character, the characters of the code will be amplified, decoded and converted from "Touch Tone" type characters to characters of the decimal type, the decimal characters will be compared with the characters of codes memorized at the exchange, the compared characters will be decoded to determine the sequence and the time spacing with which they have been received and a validation signal will be generated in response thereto. If the code is a right one, the validation signal will produce again the closing of the connection between the exchange and the phone subscriber and he will receive the ringing signal which will advise him that the call has been originated by a person who is in possession of the pre-established code.

The method comprises also the possibility of sending a ring-back signal to the calling party in response to the validation signal so as to advise him that his code has been validated.

Another possibility is that the phone subscriber may, from his end, enable or disable the code control feature by sending, through his phone set a single code character which, in the case of a "Touch Tone" telephone system, may be the key corresponding to the symbol "*" or "#". If, after sending this special code character, he receives a ring-back signal, he will know that the system has been put in conditions of receiving any call without need that the calling party sends a pre-established code. If he presses the key corresponding to said special code and he does not receive the ring-back signal, he will know that the system has been put now in the condition in which it will be necessary that the calling part sends a code to allow the call to reach the subscriber's phone set.

DESCRIPTION OF PREFERRED EMBODIMENTS

Figure 1:
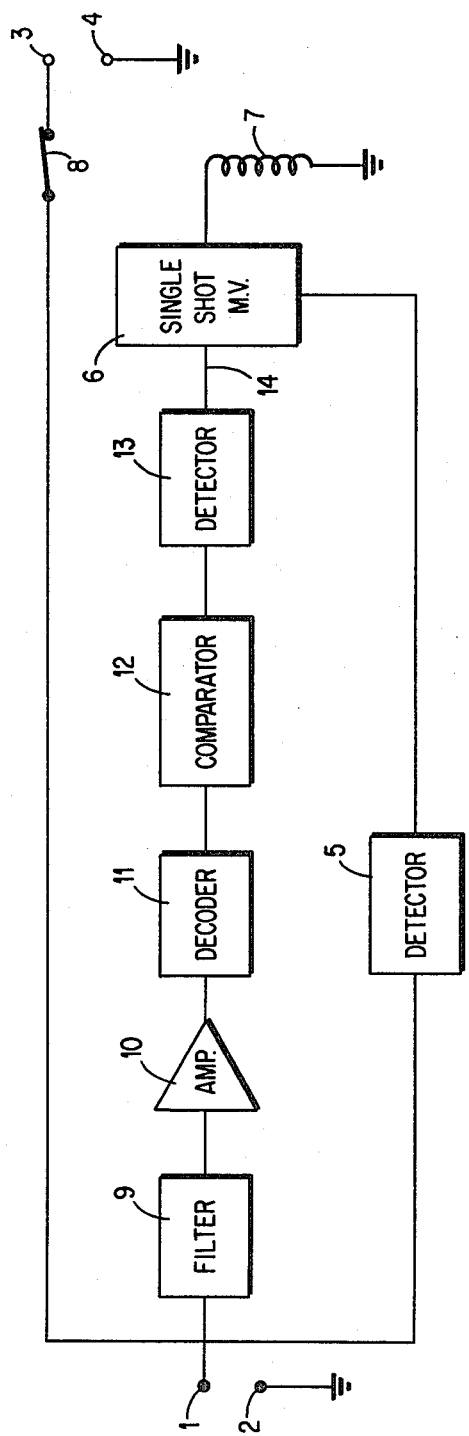
FIG. 1 is a schematic representation in block form which is useful to describe the essential principle of the method of the invention.

FIG. 1 is a block diagram which allows to explain better the essential principles of the method of the present invention. It can be seen that a circuit arrangement which allows putting into practice the method of the invention comprises input terminals 1 and 2 which will be connected at the output of the final selector stage of the exchange corresponding to a particular subscriber. It also comprises output terminals 3 and 4 which will be connected to the phone line connecting the phone subscriber set to the exchange. When a call for this particular subscriber has been detected by the exchange, the final selector stage of this latter will connect the input terminals 1 and 2 to the line linking the calling party line with the exchange. Thus, at terminals 1-2, the ringing signal generated at the exchange will be received and will be applied to ringing signal detecting means 5 which will generate an output signal in response to the presence of the ringing signal at input terminals 1-2. Said output signal is applied to one of the inputs of triggering means 6 producing the energization of a relay 7 having a normally closed contact 8 which is connectable in series between the input terminal 1 and the output terminal 3. Said contact 8 will thus be opened preventing the ringing signal from reaching the phone subscriber's set. However, if the calling party sends now a pre-established code, the signal corresponding to this latter will pass through filtering means 9 which will let them pass through but preventing the passage of the ringing signal. The code characters appearing at the output of filtering means 9 are amplified by amplifying means 10 which preferably incorporate automatic level control. The amplified signals are applied to "touch-tone" to decimal decoding means 11 which will convert the "touch-tone" code characters to characters of the decimal type. The output of the decoding means 11 is applied to character selecting means 12 which will compare the received code characters with the characters of at least one code memorized therein. The selected characters are then applied to sequence decoding means 13 which will determine if the characters are received in the right sequence and with the right time spacing between them. If both conditions are met, at the output 14 of sequence decoding means 13 will appear a validation signal which will be applied to a second input of triggering means 6. However, if these latter receive at both inputs a signal, that is to say a detected ringing signal and a validation signal, relay 7 will be de-energized thus closing contact 8 and establishing a direct connection between the final selector stage of the exchange and the phone subscriber's set.

Thus, it may be seen that if only ringing signal is received at the corresponding input of triggering means 6, while no validation signal is applied to the second input thereof, contact 8 will remain opened and the subscriber's phone set will not receive any ringing signal. This will happen if the calling party has not sent a code or if he has sent a wrong one. Instead, if he has sent a right code, contact 8 will close after the validation of the code and the called subscriber will receive the call.

Figure 2:
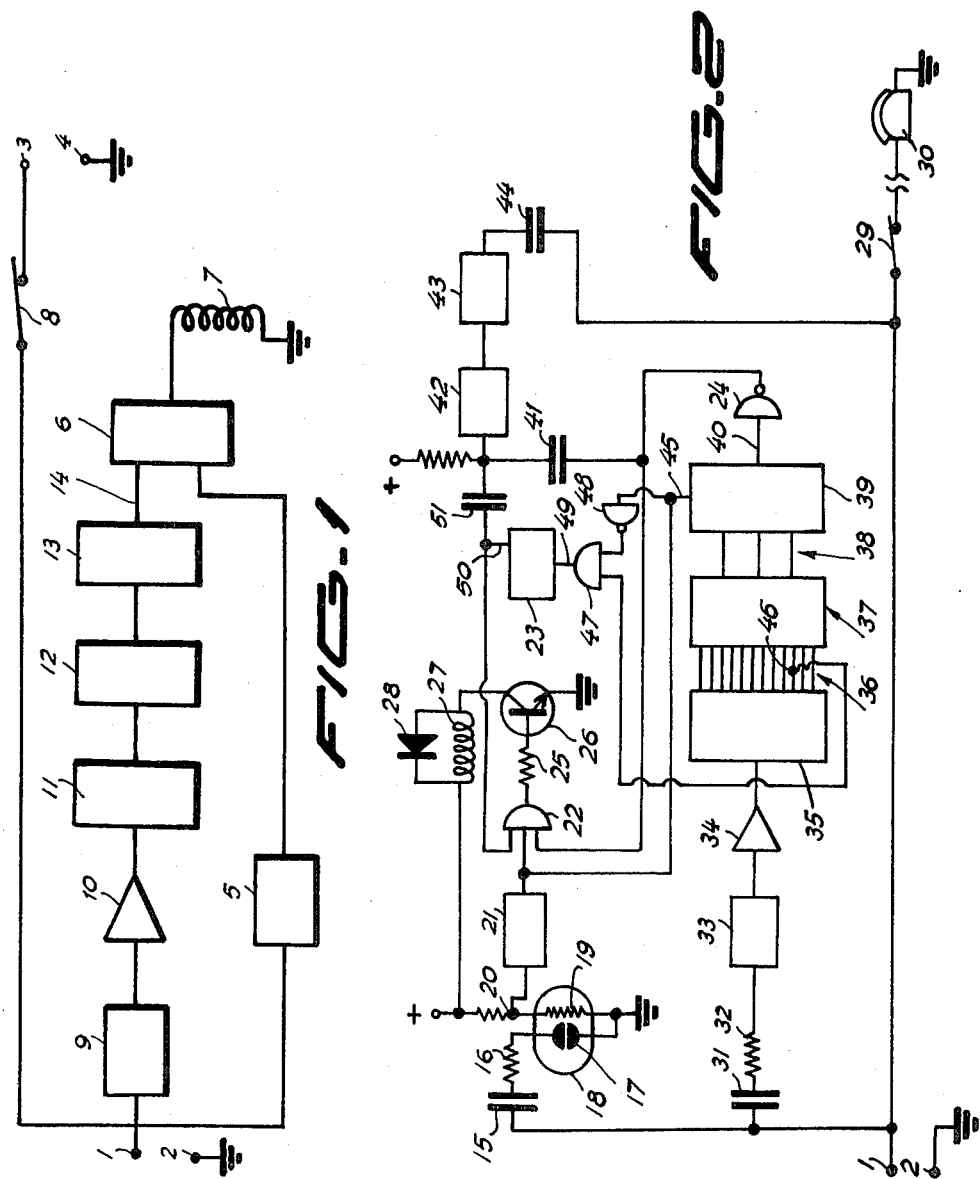
FIG. 2 is a schematic representation, partially in block form, illustrating a practical implementation of an apparatus suitable for putting into practice the method of the present invention and which will be provided at the exchange to which the phone subscriber pertains.

In FIG. 2 a practical implementation of an apparatus, which allows putting into practice the method of this invention, is shown. When ringing signal is received at input terminals 1-2, it will be applied through a capacitor 15 and a resistor 16 to the neon light section 17 of an optoelectronic coupler 18. The neon light section 17 will be lighted producing a variation of resistance in the photoresistor section 19. The corresponding variation of electric potential at point 20 is applied to a retriggerable monostable device 21 which has a time constant of about 2.5 seconds. The output of monostable 21 is applied to one of the inputs of an "AND" gate 22. At the same time this gate receives at another of its inputs a signal from flip-flop 23 and at its third input is receives another signal from the output of an inverter 24. Thus, the output of "AND" gate 22 will activate, through resistor 25, a transistor 26 which will become conducting. In consequence, transistor 26 will energize relay 27 which has connected in parallel therewith a protective diode 28. The energization of relay 27 produces the opening of the normally closed contact 29 which will thus open the connection between input terminal 1 and the phone subscriber's set 30.

If the calling party sends now a code signal comprising at least one character, it will be applied through capacitor 31 and resistor 32 to the input of highpass filtering means 33 having a cutoff frequency of about 650 Hz. These filtering means prevent the passage of the ringing signal, which is present at input terminals 1 and 2, however allowing the passage of the "Touch Tone" characters of the code which will thus be applied to amplifying means preferably 34. The amplifying means will have automatic level control features. The amplified signals appearing at the output of amplifying means 34 are then applied to decoding means 35 which will convert the pair of tones of a "Touch Tone" character into a character of the decimal type, giving rise to the appearance of a decimal character at a corresponding one of the outputs 36. The corresponding signals are then applied to respective inputs of character selecting means 37 which will let through the characters only when they correspond to the characters of a code memorized in the character selecting means. However, they will not take into account the sequence in which the characters are received, nor the time spacing between successive characters. The characters appearing at the output of character selecting means 37 are applied to the inputs of sequence decoding means 39. These latter will determine if the sequence in which the characters are received, and the time spacing between successive characters, are right. If these conditions are met, at the output 40 will appear a validation signal which will be inverted by inverter 24. The validation signal appearing at the output of this latter will produce two effects. The first one is to disable the "AND" gate 22 thus deactivating transistor 26 which will become non-conducting and consequently relay 27 will be de-energized closing contact 29. This will establish now a direct connection between the input terminal 1 and the phone subscriber's set 30. This latter will now receive the ringing signal advising him that a call is being received. The second effect produced by the validation signal is to apply through capacitor 41 a triggering signal to a monostable 42 which is triggered only in response to the trailing edge of a pulse and having a time constant of about 1 second which will trigger during said time a ring-back signal generator 43 the output of which will apply, through capacitor 44, a ring-back signal to the phone line which will advise the calling party that his call has been validated and that the called subscriber is being ringed. When the called subscriber attends the call by unhooking the receiver of his phone set 30, ringing signals will no longer be applied to the optoelectronic coupler 18 and thus the ringing signal detector 21 will no longer enable the "AND" gate 22. At the same time the output of ringing signal detector 21 will now reset the apparatus through the reset input 45 of sequence decoding means 39, resetting these latter.

The entire system may be put out of operation by the phone subscriber. To do so, he simply unhooks the receiver of his phone set and presses the key corresponding to the special code intended for this operation, such as, for example, the key corresponding to "*". However, the skilled in this art will easily understand that any other key may be used to that end if the system is designed therefor. In this example it will be assumed that the "*" key is used. The corresponding pair of tones will pass through contact 29, capacitor 31, resistor 32, filtering means 33, amplifying means 34 and will then be applied to decoding means 35. Thus, a decimal type output signal will appear at the output 46 thereof. This signal will be applied to one of the inputs of an "AND" gate 47, its other input being coupled to the output of an inverter 48. The input of this latter is coupled to the output of the ringing signal detector 21. Since both inputs of "AND" gate 47 will be enabled, at the output of this gate will appear a signal which will be applied to the clock input 49 of flip-flop 23, producing a change of state thereof. This means that "AND" gate 22 will be disabled and thus contact 29 will remain closed. At the same time the output 50 of flip-flop 23 will produce a pulse which will be applied, through capacitor 51, to monostable 42 which will be triggered by its trailing edge and will trigger the ring-back signal generating means 43 applying through capacitor 44 a brief ring-back signal to the phone line which will advise the phone subscriber that the apparatus has changed its state. If the phone subscriber desires to revert again this state, he simply needs to press again the "*" key reverting the operation and the entire system will again be put into operation. In the first case the called subscriber may receive directly any call through his line not being necessary that the calling party sends a code. In fact, if he would do so, the code would not have any effect at all. In the second case the phone subscriber can only receive calls which come accompanied by a corresponding pre-established code.

Figure 3:
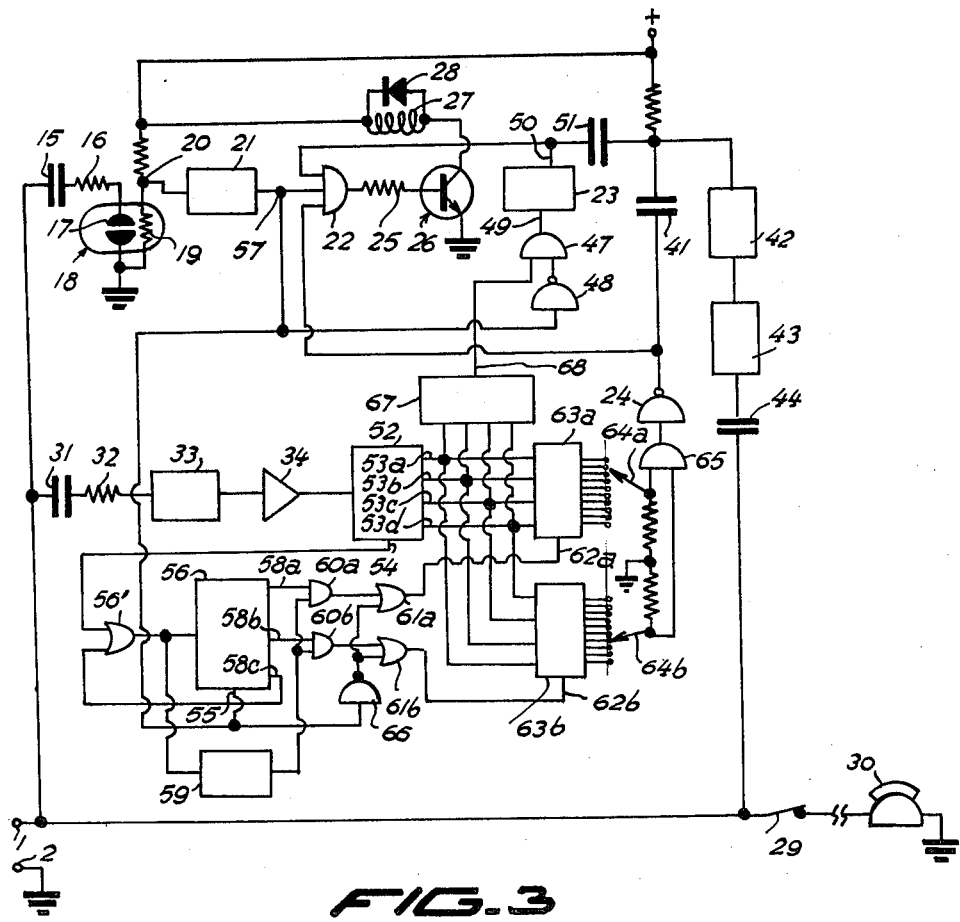
FIG. 3 is a schematic representation, partially in block form, illustrating a practical implementation of another embodiment of an apparatus suitable for putting into practice this invention.

In FIG. 3 another way of putting into practice the method of the present invention is shown. In a certain sense it is similar to the embodiment shown in FIG. 2. However, the implementation of the decoding means, the character selecting means and the sequence decoding means are rather different.

As it can be seen in FIG. 3, the code characters, after having been amplified by the amplifying means 34, furnished with automatic level control, are applied to the input of tone decoding means 52 which are capable of converting the pair of tones of each "Touch Tone" character into a character of the binary type appearing at their outputs 53a, 53b, 53c and 53d, these latter representing the binary weights $2^0$ to $2^3$. The output 54 is an "any tone" output becoming activated each time the binary code, corresponding to the decoded character, appears at said outputs 53. When a "Touch Tone" character is applied to the input of the tone decoding means 52 from the amplifying means 34, it will be decoded so that at the outputs 53 the corresponding binary code will appear. Output 54 will change from low to high. Since at the clock input 55 of counting means 56, said clock input being connected to the output 57 of the retriggerable monostable device 21, a high state appears due to the presence of ringing signal, the counting means, capable of counting up to three and responsive to the trailing edge of a pulse, will be enabled and in their zero state; thus, at their output 58a a high state will be present. Since "OR" gate 56' receives, at its other input, a low state from output 58c of counting means 56, at the output of said gate a high state will appear triggering monostable 59, a high state appearing at the output thereof during a few miliseconds, enabling "AND" gates 60a and 60b. Gate 60a, on receiving at both inputs a high state, will produce at its output a high state which will be applied to one of the inputs of an "OR" gate 61a, at the output of which a high state will appear that will be applied to the data transfer input 62a of memory means 63a capable of producing a decimal output. The received digit remains stored in said memory means. The outputs of these latter are connected at 64a so as to furnish a high state at the output corresponding to the digit of the pre-established code when the received code is a right one. Instead, if a wrong code is received, the high state will appear at another corresponding output, but it will exert no effect since only a specific one of the outputs is connected to 64a. When the sending of the character comes to its end, the "any tone" output 54 of the tone decoding means 52 will change to a low state, thus advancing one stage the counting means 56. This means that a high state will appear at its output 58b. When the second character of a code appears at the input of the tone decoding means 52, the binary character appearing at its output 53 will be transferred to memory means 63b through gates 60b and 61b and the data transfer input 62b. Thus, the counting means 56 will be driven to their second stage, a high state appearing at their output 58c, blocking "OR" gate 56'. In this condition, the counting means will be blocked against the entrance of any further characters. If the characters of the received code are the right ones, the activated outputs of memory means 63a and 63b will correspond to the corresponding ones connected to 64a and 64b. This means that both inputs of "AND" gate 65 will receive a high state; its output is inverted by inverter 24, and at the output of this latter a low state will appear representing the signal validating the code. If no longer ringing signal is received, at the output 57 of monostable 21 a low state will appear, thus resetting a zero the counting means 56 and, through inverter 66, a high state will be applied to "OR" gates 61a and 61b which will reset to zero memories 63a and 63b.

The way in which the phone subscriber may change the state of the apparatus of FIG. 3, from operative to inoperative by sending a special code comprising a single character such as, for example, the character " * ", is substantially the same as that described with reference to FIG. 2. The difference lies in the provision of a binary to decimal decoder 67 having four inputs which are coupled in parallel with the outputs of the tone decoding means 52. Decoder 67 has a single output 68 which will be activated only in response to the reception of the character of the single character code, but not responding to any other character. This output corresponds to the output 46 of the tone decoding means 35 of the embodiment shown in FIG. 2. From any other point of view the operation of changing the operative state of the apparatus is essentially the same as that described with reference to FIG. 2.

While specific embodiments of apparatus, for putting into practice the method of the present invention have been described herein in detail, the skilled in the art will easily understand that some changes and substitutions of components may be made therein which will be however comprised within the true spirit and scope of the invention.

We claim:

1. A method for initially opening and subsequently completing the connection between a telephone exchange and a called subscriber in response to the reception, at the exchange, of a pre-established code from a calling end, the method comprising, once a final selector stage at the exchange has completed its selecting operation in response to a call, the steps of: (A) detecting at the exchange the presence of a ringing signal at the output of the exchange final selector stage corresponding to the phone line of the called subscriber; (B) opening the connection between said final selector stage and the called subscriber's line in response to the detection of said ringing signal; (C) filtering-out the ringing signal and letting through "Touch-Tone" code signals received from the calling end; (D) decoding the characters of the "Touch-Tone" code signals; (E) comparing the decoded characters with predetermined characters and generating a validation signal in response to a match between said decoded and predetermined characters; and (F) closing again the connection between the exchange final selector stage and the called subscriber's line in response to said validation signal and consequently sending ringing signals to the called subscriber.

2. A method as recited in claim 1 further including, after step (C), amplifying the code signals before decoding the code signals.

3. A method according to claim 2, characterized by sending a special code, from the phone set of the called subscriber to prevent the opening of the connection between the called subscriber's line when an incoming call is received at the exchange.

4. A method according to claim 3, characterized by sending a ring-back signal to the called subscriber in response to the reception, at the exchange, of said special code.

5. A method according to claim 2, characterized by sending to the calling end a ring-back signal in response to said validation signal.

6. An apparatus for initially opening and subsequently closing the connection between a telephone exchange and a called subscriber in response to the reception, at the exchange, of a preestablished code from a calling end, which apparatus comprises: (A) ring detector means for detecting at the exchange the presence of a ringing signal at the output of a final selector stage corresponding to the phone line of the called subscriber; (B) switch means for opening the connection between said final selector stage and the called subscriber's line in response to the detection of said ringing signal; (C) filter means for filtering out the ringing signal and passing through "Touch-Tone" code signals received from the calling end; (D) decoding means for decoding the characters of the "Touch-Tone" code signals; (E) means for comparing the decoded characters with a predetermined set of characters and for generating a validation signal in response to a match between said decoded and predetermined characters; (F) means responsive to said validation signal for closing said switch means thereby to connect said exchange final selector stage to said called subscriber's line thereby to consequently send ringing signals to the called subscriber.

7. An apparatus as recited in claim 6 further including (G) amplifier means connected to said filtering means for amplifying said code signals.

8. An apparatus as recited in claim 6 further including (G) acknowledging means responsive to said validation signal for sending to said calling end a ring back signal.

9. An apparatus as recited in claim 6 further comprising (G) means for disabling the operation of said switch means responsive to a special code from the called subscriber thereby to prevent the opening of the connection between the called subscriber's line and the exchange.

10. An apparatus as recited in claim 9 further including, (H) means responsive to said disabling means for sending a ring back signal to the called subscriber in response to the reception, at the exchange, of said special code.

* * * * *